Patented Aug. 16, 1932

1,872,255

UNITED STATES PATENT OFFICE

ANTHONY G. DE GOLYER, OF NEW YORK, N. Y.

WELDING

No Drawing.   Application filed April 10, 1931.   Serial No. 529,296.

The present invention relates to methods and materials for welding metals, and is a continuation in part of my pending application, Serial No. 184,444 filed April 16, 1927. The invention relates particularly to the use of intermetallic compounds of boron for use in protecting and purifying metal melted at, or to form a weld and is applicable to various methods of welding.

In the operation of welding metals by fusion processes, especially by means of either the oxyacetylene flame, or the electric arc, both the metal introduced to form the weld and a portion of the metal article welded are subjected to the action of oxygen, nitrogen, hydrogen, and possibly other gases, at elevated temperatures with the result that oxides, nitrides and other compounds are formed within the weld and in a zone adjacent to the area that is molten during the operation. The occurrence of such oxides, nitrides, etc., results in defects, such as embrittlement, segregations of oxides or slag, porosity due to occluded gases or to reaction of oxygen, etc. with constituent elements of the weld or base metal. In addition, it has been found that under conditions prevailing in the welding of many metals and alloys the action of oxygen, nitrogen, etc., during the operation causes material changes in the chemical composition of both the metal introduced into the weld, as well as in that portion of the original metal surrounding the weld which has been raised to a temperature above 500° C. Such alteration of chemical composition is particularly marked in the case of cast iron, carbon steel, alloy steel, nickel and nickel alloys, chromium and chromium alloys, tungsten, tungsten alloys, molybdenum, molybdenum alloys, copper-zinc alloys, copper-tin alloys, copper-manganese alloys and, in general, in metals or alloys which readily react with oxygen, nitrogen and hydrogen at temperatures prevailing in fusion welding operations.

Cast iron, for example, is difficult to weld successfully by means of the electric arc owing to the excessive loss of graphitic carbon and other changes which take place in the chemical composition of the weld metal and original metal through the action of oxygen and nitrogen. In addition, the weldig of cast iron by the oxyacetylene method is only partially successful by reason of the fact that when an oxidizing flame is used an excessive amount of graphitic carbon is oxidized, and when a reducing flame is employed the excess acetylene tends to introduce carbon, resulting in the formation of white cast iron which can not be machined, drilled or otherwise worked in conjunction with the original grey cast iron. The welding of carbon steel, as a further example, usually results in appreciable losses of carbon, silicon, manganese and other essential components, with a consequent alteration of chemical composition and physical characteristics.

It will thus be seen that the welding of iron, steel and all ferrous alloys generally results in the formation of a weld area which is different in chemical composition from that of the original metal. Following the welding operation in such cases, strains are set up in the welded article due to rapid cooling from above the critical temperature of two dissimilar compositions in intimate contact. The effect of a steep carbon gradient in the case of cast iron, steel, etc., frequently results in cracks, and invariably forms weakened areas.

It has also been found that nitrogen enters into active reaction with solid metal surrounding the weld, i. e., within a zone in which the temperature is raised to 350° C., or higher, with the resultant formation of nitrides, and possibly other compounds, which cause embrittlement, and the relatively high percentage of failures by reason of such embrittlement has been a limiting factor in the use of electric welding of iron and steel, and many iron alloys.

Various methods have heretofore been proposed for preventing the detrimental effect of oxygen, nitrogen, etc., during fusion welding, among such proposals being the use of certain non-metallic materials in the nature of fluxes. Non-metallic fluxes are never more than partially effective in removing metal oxides from molten weld metal, and are wholly ineffective for removing therefrom or preventing the occurence of nitrides. In addition, the use of certain reducing agents such as aluminum, barium, cerium, boron, silicon, magnesium and titanium has been proposed, but none of such agents has proved satisfactory, chiefly because they were readily soluble in the metals welded, and consequently the use of such agents resulted in residual impurities in the weld or the formation of undesirable alloys. Furthermore, the agents proposed do not react with oxides at temperatures lower than the melting point of the metal welded, and do not effectively react with nitrogen under conditions prevailing in fusion welding, while others, such as boron carbide, react with oxygen only at extremely high temperatures and under conditions which are difficult to maintain in commercial operations.

I have discovered that while pure or uncombined boron is not efficient or effective in purifying or removing oxides, nitrides, etc., from metal welds, certain intermetallic compounds of boron are efficient and effective for these purposes. I have also discovered that intermetallic compounds of boron, such as calcium boride, aluminum boride, titanium boride, barium boride and others hereinafter more fully set forth, are reactive for the purpose of reducing to the metallic state or preventing the occurrence of metal oxides, nitrides and other injurious compounds in welds at temperatures below the melting point of the majority of metals welded, and that by maintaining a supply of such boron compounds, in a substantially unoxidized condition, within the area being welded, that the injurious effects of the action of oxygen, nitrogen, etc., can be entirely prevented and virtually all metals and alloys may me successfully welded by means of well known fusion processes. Calcium boride and barium boride, for example react with oxygen, nitrogent, hydrogen, sulphur, or compounds thereof, to reduce them at temperatures materially lower than the melting points of cast iron, copper, steel and steel alloys. Furthermore, calcium boride and barium boride are not soluble in cast iron, steel, steel alloys, chromium alloys, copper, copper alloys and many other commercially important metals and alloys under conditions prevailing in fusion welding, consequently the use of such boride does not result in residual impurities in the weld metal or base metal.

I have also discovered that by means of the proper introduction, as hereinafter more fully set forth, of calcium boride, barium boride, titanium boride or other intermetallic compounds of boron comprised in this invention that cast iron, iron alloys, carbon steel, alloy steel, nickel, nickel alloys, chromium, chromium alloys, tungsten, tungsten alloys, molybdenum, molybdenum alloys, tantalum, tantalum alloys, copper, copper alloys and many other metals and alloys can be economically and satisfactorily welded by fusion processes with no change in the chemical composition of the weld, nor diminution of physical properties through the action of oxygen, nitrogen, etc., at elevated temperatures. Further, the composition of the weld metal can be more closely controlled by the use of the reagents of this process than by any other means. It is evident then that these characteristics make these materials highly useful and desirable for metal purifying and deoxidizing during welding.

I have found that intermetallic compounds of boron are appreciably more effective for reacting with oxygen, nitrogen, etc., or metal oxides, metal nitrides, etc., than boron alone or any of the heretofore proposed reducing agents. I have also discovered that intermetallic compounds of boron, i. e., chemical compounds of boron with any one or more of the group of metals hereinafter specified, are substantially insoluble in weld metal under the conditions usually prevailing in fusion welding. The borides of the present invention react with oxygen, nitrogen, etc., or metal oxides, metal nitrides, etc., at relatively low temperatures, e. g., approximately 550° C., to form borates which are not soluble in metals. Boron is either insoluble or difficultly soluble in a number of metals, and it appears that when boron is chemically combined with any one of the metals specified herein virtually all of such borides are insoluble in weld metal under conditions prevailing in fusion welding. Therefore, it is essential that the intermetallic boron compounds employed as reagents in the operation of this process be wholly or principally in the form of chemical compounds. The metallic elements which I have found to be useful and efficient in chemical combination with boron for the operation of this invention are calcium, magnesium, aluminum, silicon, lithium, cadmium, barium, manganese, titanium and zirconium.

In the practice of the invention the metal boride is added at or adjacent to the areas being welded by sprinkling powdered or lump material thereto when the weld metal or the base metal or both are heated or molten. The boron compound may also be used as a coating on the weld rod or electrode, or it may form a component of a weld rod aggregate. The boron compound can be pressed to form rods or sticks, and in other forms a tube or hollow rod is provided with a filling comprising one of the metal boride compounds. The material of the tube can be paper or cardboard or other inflammable material, in other cases it is of metal in which case it can be used for supplying a portion or all of the metal added to the weld. Metal which will not be united to the weld is used in some cases, the metal being chosen as one which will burn or melt to pass out of the way as the rod which it comprises is consumed during the welding operation. In some cases the intermetallic boron compounds are mixed with non-metallic materials which serve as carriers or retainers therefor. In general the materials most suitable for this purpose are ones which are more or less inert under welding conditions, such, for example, as borax, calcium borate, sodium carbonate, calcium fluoride, sodium acetate, sodium fluoride, and so on. A mechanical mixture of titanium boride, sodium carbonate and borax or of calcium boride and calcium borate are example. The object of using the inert material is to form a fused or partially fused mass at and immediately surrounding the weld area, as such fused or semi-fused material aids in retaining the unoxidized boron compound at and about the area being welded, thus enabling the reagent to react directly with gas or gases present and also with any metallic oxides, nitrides, etc. present. The products of reaction of the intermetallic boron compounds are borate slags, that is, oxidized or other non-metallic compounds which have relatively low melting points and which readily separate from the molten metal and are not occluded therein.

In a specific illustrative embodiment, for example, copper can be welded to copper, or to some other metal such as iron or steel, to secure strong welds by the use of metal borides as a purifying agent according to this invention, calcium boride being suitable, for example. The welding can be done in manners well known in the art. For the welding of copper the use of a metal boride has a unique advantage in that metal borides, calcium boride, for example, react with metal oxides at a temperature below the melting point of copper, so that copper can be welded at temperatures which are no higher than the melting point thereof and at temperatures at which oxidation during the welding is reduced to a minimum or entirely avoided. Copper metal can be added to the weld in the form of a stick or rod; and, when desired, the metal boride, calcium boride, for example, can be added separately or in the form of an attachment to the copper rod as by wrapping the metal rod and metal boride together in paper or by forming a cake or paste of the calcium boride along the length of the rod.

I have found that when the boron reagents of this invention are properly applied in the welding operation the chief function of such reagents is to prevent reaction of oxygen, nitrogen and possibly other gases with the molten metal and such portion of the original base metal as may be heated to an elevated temperature, i. e., the boron compounds react with products of combustion gases caused by the oxyacetylene flame, etc., or with oxygen, nitrogen and other gases within and immediately surrounding the electric arc, thus preventing the reaction of such gases with the weld and base metal. Consequently, it will be evident that the chief value of the boron reagents of this invention is in preventing the formation or occurrence of impurities such as metal oxides, nitrides, etc., in welds, rather than as an agent to remove such impurities after they have been formed, as occurs in present welding practices. It will be understood, however, that when oxides, nitrides, etc. are present in the weld area, that the chemical compounds of boron of this invention will react to reduce such oxides, nitrides, etc., under the conditions prevailing in fusion welding.

An essential of the invention is that there be supplied to the weld area a chemical compound of metal or metalloid and boron, in which compound oxygen is absent entirely or to such a degree that the highly reactive effect characteristic of metallic boron compounds, such as borides, is highly effective in reacting with oxygen, nitrogen, etc., and also with metal oxides, metal nitrides, etc. It is also essential that the chemical compound of boron employed as a reagent be of such composition as to be substantially insoluble in the molten metal of the weld, or in such portion of the original metal surrounding the weld as may be heated to an elevated temperature. Furthermore, the quantity of intermetallic boron compound supplied to the weld area should be sufficient to insure reaction with harmful gases present, as well as metal oxides, nitrides, etc.

Although I have described and pointed out in the annexed claims certain novel features of the invention, it will be understood that various omissions, substitutions, and changes in the several steps of the process and in its operation and in the form and details of the weld rod or electrode structures involved and in the preparation thereof may be made by those skilled in the art without departing from the spirit of the invention.

I claim:

1. A weld rod comprising a portion of ferrous metal and a portion comprising intermetallic boron compound insoluble in said ferrous metal and of material selected from the following group of elements: magnesium, calcium, aluminum, silicon, lithium, cadmium, barium, manganese, titanium and zirconium.

2. In the method of welding copper the step of producing oxygen free copper in the weld which comprises supplying at the weld areas calcium boride.

3. A weld rod comprising the following structure, a support portion of copper and a supported portion of calcium boride.

4. In the method of welding metals in which calcium boride is insoluble, the step which comprises supplying calcium boride at the weld during the welding.

5. A weld rod comprising a portion of copper and a portion of calcium boride.

6. In the method of welding metals in which borides of the hereinafter named elements are insoluble, the step which comprises supplying at the weld during the welding a boride insoluble in the metal being welded and of material selected from the following group of elements: magnesium, calcium, aluminum and silicon.

7. A weld rod comprising a portion of copper and a portion of boride of metal selected from the following group; magnesium, calcium, aluminum and silicon.

8. The method of welding metal which comprises introducing into the weld area an intermetallic compound of boron which is substantially insoluble in the metal welded, said intermetallic boron compound being a compound of boron and material selected from the following group of elements: colcium, magnesium, aluminum, silicon, lithium, cadmium, barium, manganese, titanium and zirconium.

9. In the welding of metals, the method of producing a weld substantially free from metal oxides and nitrides which comprises supplying to the heated area of the weld an intermetallic boron compound insoluble in the metal being welded, such intermetallic compound being a compound of boron with material selected from the following group of elements: calcium, magnesium, aluminum, silicon, lithium, cadmium, barium, manganese, titanium and zirconium.

10. A weld rod comprising a metal portion and a portion of intermetallic boron compound which is substantially insoluble in the metal of said metal portion; said intermetallic compound comprising a compound of boron with material selected from the following group of elements: calcium, magnesium, aluminum, silicon, lithium, cadmium, barium, manganese, titanium and zirconium.

11. A weld rod comprising a metal portion in which calcium boride is insoluble and a portion of calcium boride.

12. In the method of welding metal, the step of producing oxygen free metal in the weld which comprises supplying at the weld a boride.

Signed at New York in the county of New York and State of New York this 7th day of April 1931.

ANTHONY G. DE GOLYER.